United States Patent
Lo Torto et al.

(10) Patent No.: US 10,454,301 B2
(45) Date of Patent: Oct. 22, 2019

(54) SYSTEM AND METHOD FOR DETECTING AND CORRECTING DC BUS IMBALANCES BETWEEN PARALLEL COUPLED UPS SYSTEMS SHARING A COMMON BATTERY

(71) Applicant: Chloride Srl, Castel Guelfo (IT)

(72) Inventors: Matteo Lo Torto, Florence (IT); Graziano Galuppi, Imola (IT)

(73) Assignee: Vertiv S.R.L., Piove di Sacco (IT)

( * ) Notice: Subject to any disclaimer, the term of this patent is extended or adjusted under 35 U.S.C. 154(b) by 864 days.

(21) Appl. No.: 14/605,382

(22) Filed: Jan. 26, 2015

(65) Prior Publication Data
US 2015/0214783 A1    Jul. 30, 2015

Related U.S. Application Data

(60) Provisional application No. 61/932,021, filed on Jan. 27, 2014.

(51) Int. Cl.
| | | |
|---|---|---|
| H02J 7/00 | (2006.01) | |
| H02J 9/00 | (2006.01) | |
| H02J 9/06 | (2006.01) | |
| H02M 5/458 | (2006.01) | |
| H02J 3/38 | (2006.01) | |

(52) U.S. Cl.
CPC ............... *H02J 9/062* (2013.01); *H02J 3/38* (2013.01); *H02M 5/4585* (2013.01); *Y10T 307/62* (2015.04)

(58) Field of Classification Search
CPC .......... H02J 9/062; H02J 3/38; H02M 5/4585; Y10T 307/62

USPC ......................................................... 307/65
See application file for complete search history.

(56) References Cited

U.S. PATENT DOCUMENTS

| | | | |
|---|---|---|---|
| 6,757,185 B2 | 6/2004 | Rojas Romero | |
| 6,917,124 B2 | 7/2005 | Shetler, Jr. et al. | |
| 7,492,058 B2 | 2/2009 | Chen | |
| 7,800,924 B2 | 9/2010 | Oughton, Jr. et al. | |
| 7,881,079 B2 | 2/2011 | Prasad et al. | |
| 8,228,046 B2 | 7/2012 | Ingemi et al. | |
| 2008/0197706 A1 | 8/2008 | Nielsen | |
| 2011/0278934 A1 | 11/2011 | Ghosh et al. | |
| 2012/0223679 A1* | 9/2012 | Iwai | H01M 10/465 320/128 |
| 2014/0133203 A1* | 5/2014 | Alexander | H02M 3/1582 363/124 |

(Continued)

OTHER PUBLICATIONS

International Search Report and the Written Opinion of the International Searching Authority to PCT/IB2015/050589, dated Apr. 21, 2015.

*Primary Examiner* — Richard Tan
(74) *Attorney, Agent, or Firm* — Harness, Dickey & Pierce, P.L.C.

(57) ABSTRACT

The present disclosure relates to method for use with a system having first and second uninterruptible power supplies (UPS 1 and UPS 2), and where the two UPSs are connected across a DC+ and a DC− terminal of a common battery, and where a neutral imbalance between neutral lines of the two UPSs has been corrected, giving rise to a current flow from a DC− bus of one of the UPSs to a DC− bus of the other one of the UPSs. The method corrects for a nominal DC reference voltage for one of the UPSs to eliminate the current flow to the DC− bus of the other UPS.

17 Claims, 8 Drawing Sheets

(56) References Cited

U.S. PATENT DOCUMENTS

2015/0035360 A1* 2/2015 Marbach ............... H02J 7/0052
                   307/23

* cited by examiner

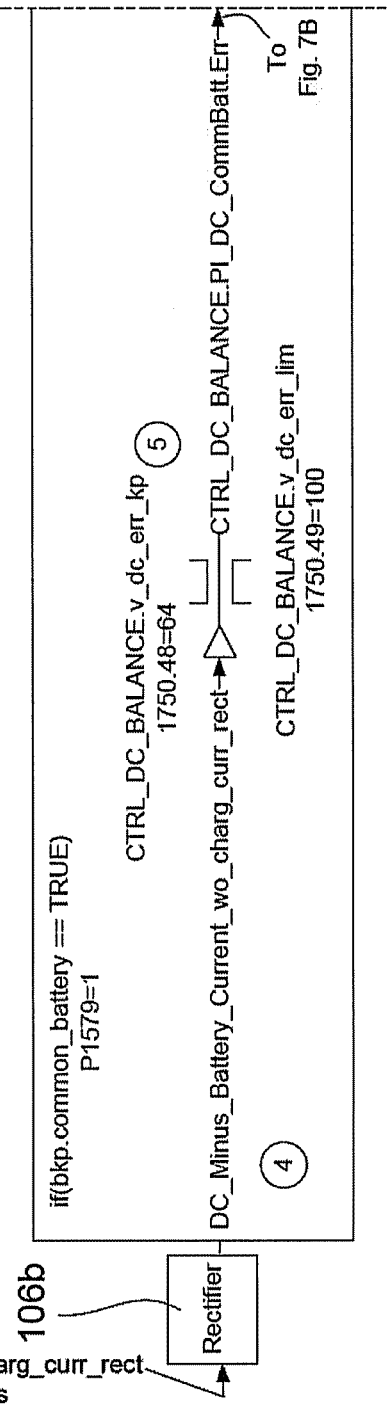
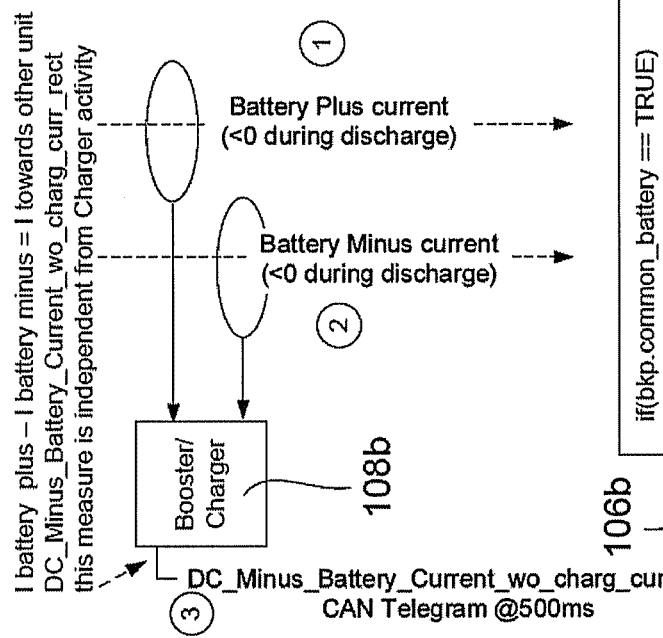
FIGURE 7A

SYSTEM AND METHOD FOR DETECTING AND CORRECTING DC BUS IMBALANCES BETWEEN PARALLEL COUPLED UPS SYSTEMS SHARING A COMMON BATTERY

CROSS REFERENCE TO RELATED APPLICATIONS

The present application claims priority from U.S. Provisional patent application Ser. No. 61/932,021, filed Jan. 27, 2014, the entire disclosure of which is hereby incorporated by reference into the present application.

FIELD

The present disclosure relates to uninterruptible power supply (UPS) systems, and more particularly to a system and method for detecting and correcting DC bus voltage imbalances between the DC− busses of two or more UPS systems connected in parallel across a common battery.

BACKGROUND

The statements in this section merely provide background information related to the present disclosure and may not constitute prior art.

In data center applications it is often desirable to share one battery in connection with two or more uninterruptible power supply (UPS) systems. An example of one such system in shown in FIG. 1, where two UPSs are sharing one battery. Typically the two UPSs are coupled in parallel across the three phase power distribution (with or without a neutral line) at an input and across a common load connection at the output. Each UPS is connected to the positive and negative terminals of a battery. The input is the power distribution connection on the Rectifier modules (not drawn in FIG. 1) while the output comes from the output junction among the UPSs (drawn in FIG. 1). In one specific implementation, one potential drawback may exist when the parallel coupled UPSs are sharing a common battery. The drawback is that a small DC reference voltage can be generated between the DC− busses of the two UPSs under some circumstances. This "imbalance" can in some circumstances result in a relatively large current flowing on the DC− busses between the two UPSs. This current is indicated by arrow "A" in FIG. 1. The current flowing between the two DC− busses may be quite large, for example in some instances up to several hundred amps in magnitude. Such a situation is undesirable because it can result in poor current sharing among the rectifier circuits of the two UPSs, for example a difference as much as 30% and 70% between the two rectifiers of the two UPSs. This can significantly limit the current which is able to be delivered by one of the UPSs to its associated load.

FIG. 2 illustrates how this imbalance may come about. This is due to tolerances of the bleed resistors Rhigh and Rlow which are present in each of the rectifier, inverter and booster modules in every UPS. These resistors typically are 5% tolerance resistors, and are all connected in parallel. With a nominal DC reference of 780V, a neutral imbalance of 1V with respect to the nominal value will produce 389V on the DC+ line and −391V on the DC− line, with respect to DC+=390V nominal and DC−=−390V nominal. This imbalance is directly reported to the DC− bar potential due to a neutral balancing algorithm that is employed in UPSs of the assignee of the present application. The neutral balancing algorithm has the task of aligning all internal neutral potentials to the neutral line of a three phase star input (VIN3STAR), which is also typically tied to ground. The aligned internal neutrals of the two UPS systems are shown in FIG. 3, where under ideal conditions Rhigh=Rlow and Neutral UPS1 equals UPS2 inside each UPS system. Under this situation no current will flow in the DC− busses between the two UPS systems.

The neutral balancing algorithm described above may involve initially summing the three phase inputs and then dividing the sum by three for internal digital signal processing purposes. Considering that the input phases are measured with respect to neutral, and due to the fact that the phases have a 3° harmonic overlap, the summed and divided signal needs to be filtered to eliminate any possible residual of the fundamental and all harmonics. From theory, the sum of the three input phases eliminates the fundamental (tri-phase) but not the third harmonic. The filter used can remove the fundamental as well as all harmonics. In particular, this can be accomplished using a moving average filter with the length of a fundamental period. The neutral balancing algorithm attempts to move this value to 0→VNX (DC offset)$_{VIN3STAR}$=0. In this example "VNX (DC offset)$_{VIN3STAR}$" refers to the potential of the internal neutral of UPS X (only the DC component) measured with respect to the center star of the tri-phase input. In those cases in which VIN3STAR allows the DC offset of the neutral with respect to GND=0V to be obtained (VIN3STAR$_{GND}$=0V), because the center star is connected to GND, this means that VNX (DC offset)$_{GND}$=0V. In this example VIN3STAR refers to the potential of the center star tri-phase input. VIN3STAR$_{GND}$ refers to the potential of the center star tri-phase input measured with respect to GND. If this is 0V, this means that the center star tri-phase input is tied to GND. VNX (DC offset)$_{GND}$ refers to the potential of the internal neutral of UPS X (only the DC component) measured with respect to GND. A gain may then be applied to the filtered result. This parameter manages the algorithm loop gain. The result is then summed to an offset value obtained using a previously implemented calibration procedure. The result is used to feed the error input of a proportional integral (PI) regulator and its output is added to a PWM (pulse width modulated) modulator signal.

The challenge described above comes about when two UPS systems are configured to share a common battery. Such a configuration is somewhat common in data center environments because it can be a significant cost savings to configure two UPS systems so that they share a common battery. Under this situation, however, when a difference in resistance exists between Rhigh and Rlow, shown in FIG. 4, and the resulting neutral imbalance between the internal neutrals of the two UPS systems is corrected by the neutral correction algorithm mentioned above, such neutral balancing will also result in shifting the DC− level (and of course the DC+ level as well) of one of the UPS systems. This "shifting" is illustrated in FIG. 5 with arrow "B" denoting the magnitude of the shift between the DC− potential of a first UPS system and the DC− potential of a second UPS system. However, this imbalance between the two DC− potentials for the two UPS systems is what results in the relatively large current flow on the DC− bus from one UPS system to the DC− bus of the other UPS system. The large current flow can result in one UPS system receiving significantly more current than the other UPS system.

SUMMARY

In one aspect the present disclosure relates to a method for use with a system having a first uninterruptible power supply (UPS 1) and a second UPS (UPS 2), and where the two UPSs are connected across a DC+ and a DC− terminal of a common battery, and where a neutral imbalance between neutral lines of the two UPSs has been corrected, giving rise to a current flow from a DC− bus of one of the UPSs to a DC− bus of the other one of the UPSs. The method corrects for a nominal DC reference voltage for the one UPS to eliminate the current flow to the DC− bus of the other UPS. The method may comprise sensing when current is flowing on the DC− bus of the one UPS to the DC− bus of the other UPS. Based on a magnitude of the sensed current flow, a determination is made of a positive voltage that is required to be added to a nominal DC reference voltage of the one UPS so that voltages of the DC− busses of the two UPSs are at least approximately equal. The method may also involve adding the determined positive voltage to a nominal DC reference of the one UPS to produce a new DC reference for the one UPS, such that the voltages of the DC− busses of the two UPSs are at least approximately equal.

In another aspect the present disclosure relates to a method for use with a system having a first uninterruptible power supply (UPS 1) and a second UPS (UPS 2), and where the two UPSs are connected across a DC+ and a DC− terminal of a common battery, and where an algorithm has been used to shift an internal neutral of a selected one of the UPSs to align internal neutral potentials of the UPSs, the alignment of the internal neutral potentials giving rise to a current flow either on a DC− bus of the UPS 2 toward a DC− bus of the UPS 1, or on the DC− bus of the UPS 1 toward the DC− bus of the UPS 2. The method corrects a nominal DC reference voltage for one of the UPS 1 or UPS 2 to eliminate the current flow toward the DC− bus of the other one of the UPS 1 or UPS 2. The method may comprise performing a sensing operation to sense a current flowing on the DC− bus of the UPS 1. The method may further comprise performing a sensing operation to sense a current flowing on the DC− bus of the UPS 2. The sensed currents may be used to determine when current is flowing on the DC− bus of UPS 2 toward the DC− bus of UPS 1. The method may also comprise performing a determining operation to determine a positive DC voltage variation required to be added to a nominal DC reference voltage for the UPS 2 so that a voltage vDC− of the DC− bus of the UPS 2 will at least approximately equal a voltage vDC− of the DC− bus of the UPS 1. Finally, the method may involve adding the determined positive DC voltage to a nominal DC reference for UPS 2 to produce a new DC reference for UPS 2.

In still another aspect the present disclosure relates to a system a system for use with at least a first uninterruptible power supply (UPS 1) and a second UPS (UPS 2), and where the two UPSs are connected across a DC+ and a DC− terminal of a common battery, and where a neutral imbalance between neutral lines of the two UPSs has been corrected, giving rise to a current flow from a DC− bus of one of the UPSs to a DC− bus of the other one of the UPSs. The system corrects a nominal DC reference voltage for the one UPS to eliminate the current flow to the DC− bus of the other UPS. The system may comprise a first current transducer for sensing in real time a current flowing on the DC− bus of the one UPS, and a second current transducer for sensing in real time a current flowing on the DC− bus of the other one of the UPSs. A first digital signal processor may be included which is associated with the one UPS, and responsive to the sensed current flowing on the DC− bus of the one UPS, and also a sensed current on a DC+ bus of the one UPS. A second digital signal processor may be included which is associated with the other UPS, and which is responsive to the current flowing on the DC− bus of the other one of the UPSs, and also to a sensed current on a DC+ bus of the other UPS. Each digital signal processor is configured to determine, based on the sensed current flow associated with its respective DC− bus, when current is detected as flowing on its associated DC− bus to the DC− bus of the other UPS, and to determine a positive voltage which needs to be added to a nominal reference voltage of its associated UPS so that voltages of the DC− busses of the two UPSs are at least approximately equal. The system may add the determined positive voltage to a nominal DC reference of the one UPS to produce a new DC reference for the one UPS, such that the voltages of the DC− busses of the two UPSs are at least approximately equal.

BRIEF DESCRIPTION OF THE DRAWINGS

The drawings described herein are for illustration purposes only and are not intended to limit the scope of the present disclosure in any way.

DETAILED DESCRIPTION

Figure 1:
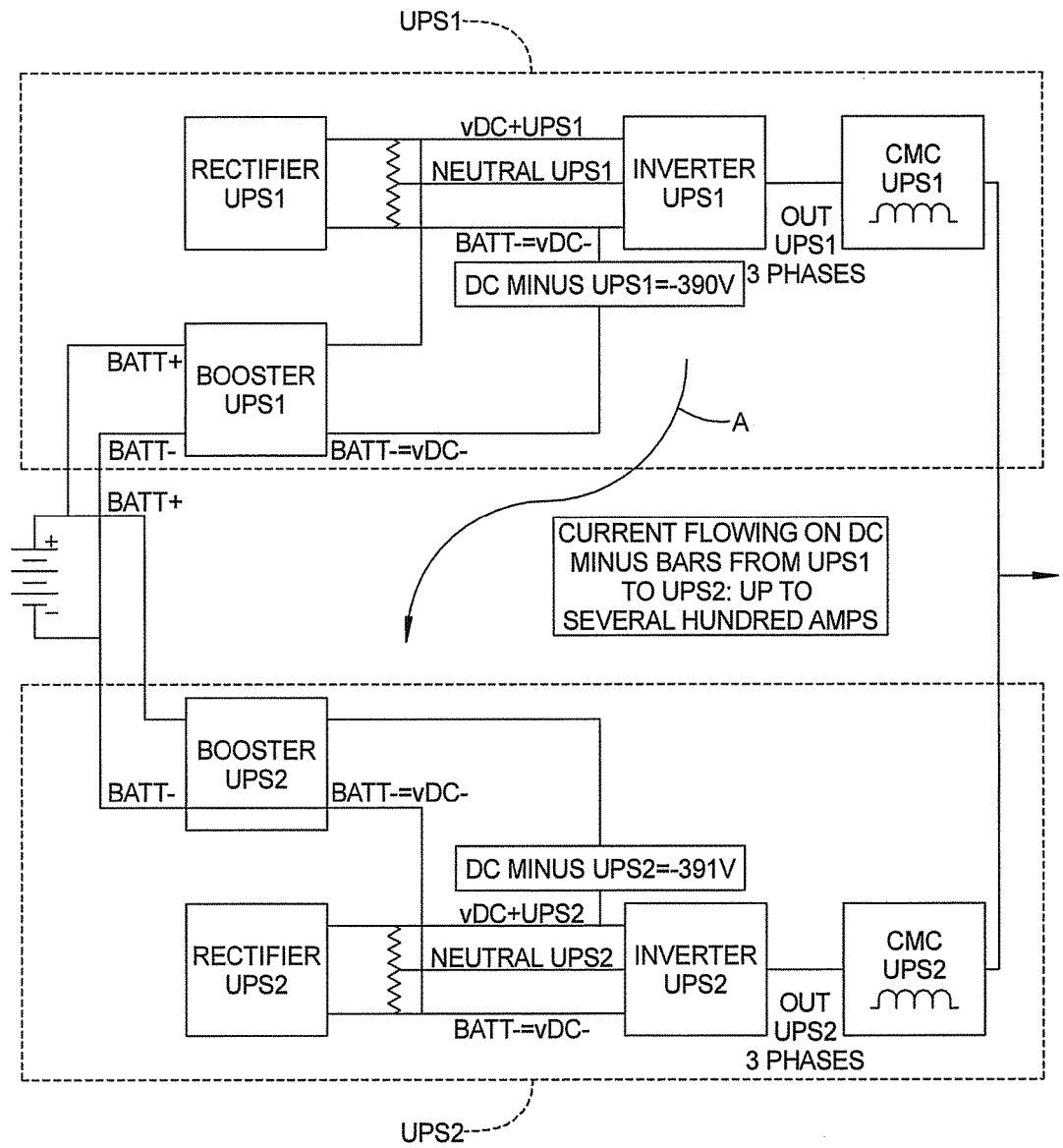
FIG. 1 is a simplified schematic block drawing of a prior art configuration where two UPS systems are configured in parallel to share a common battery.
Figure 2:
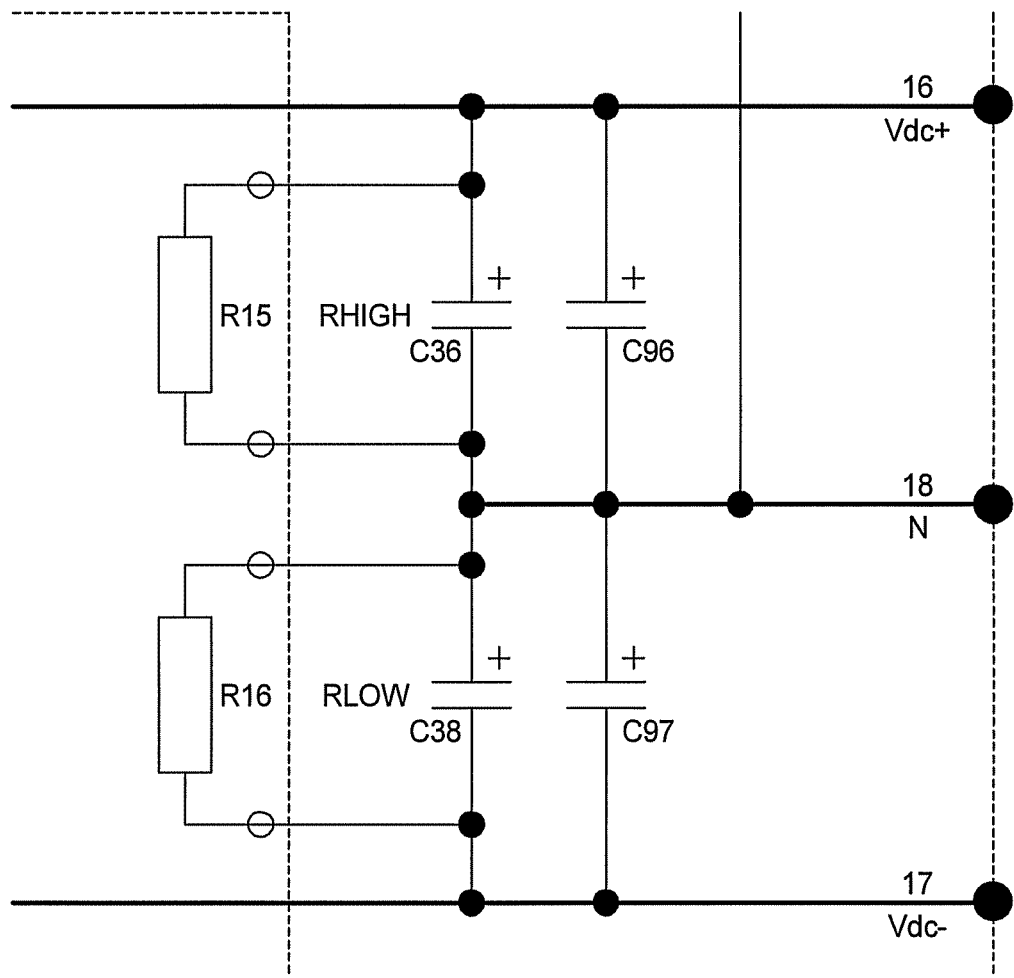
FIG. 2 is a prior art, simplified schematic diagram that illustrates the two bleed resistors that are present in each rectifier, inverter and booster module of each UPS, and whose tolerances cause the internal neutral imbalance that results in the undesirable difference in DC− bus voltages between the two UPS systems when they are both coupled across a common battery.

The following description is merely exemplary in nature and is not intended to limit the present disclosure, application, or uses. It should be understood that throughout the drawings, corresponding reference numerals indicate like or corresponding parts and features.

Figure 6:
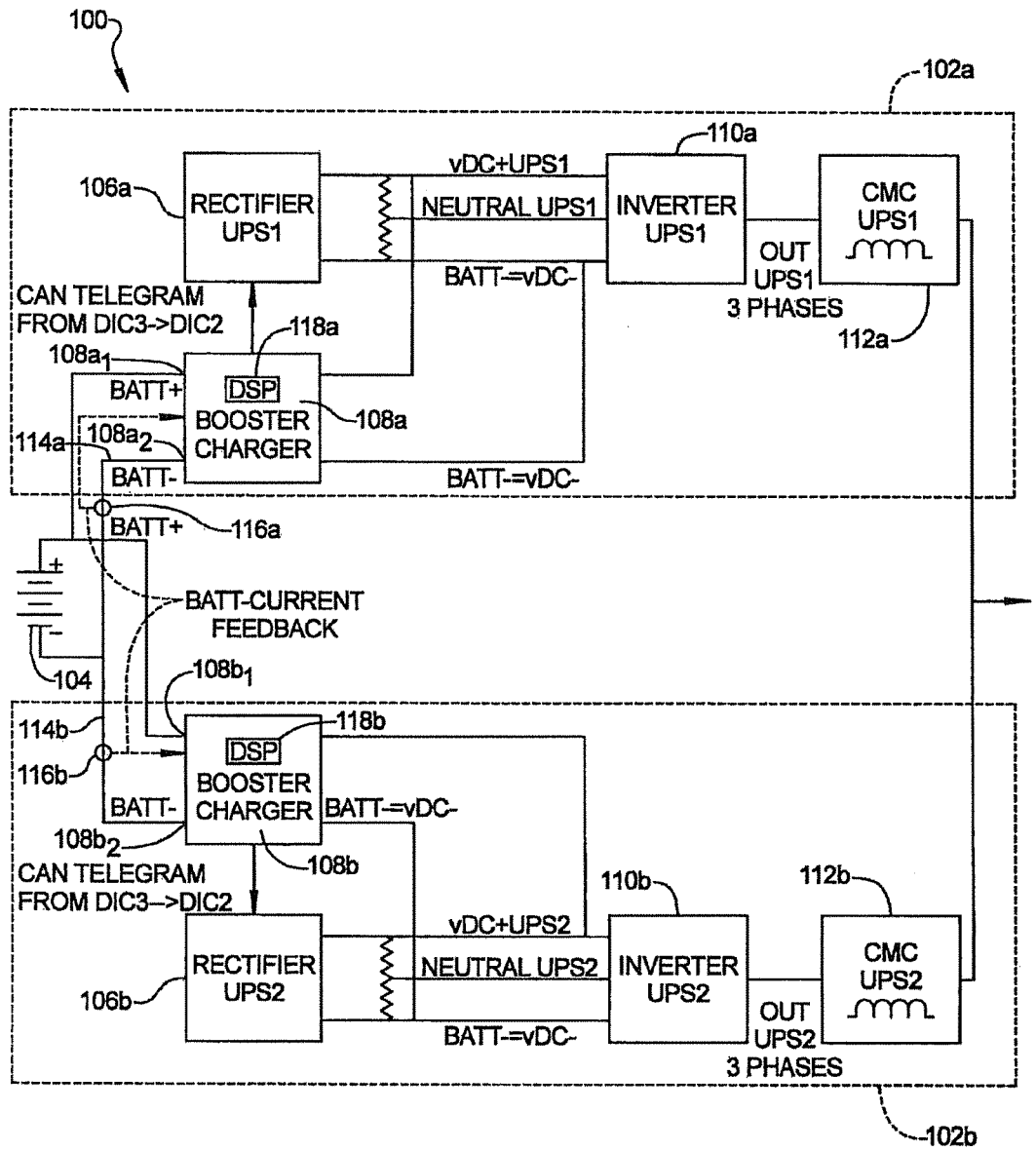
FIG. 6 is a high level schematic diagram showing how current may be sensed on the battery− power wires (connected to DC− bus bar inside the UPS) of each of the UPSs and the resulting current signals fed to the DSP of each booster/charger, before the booster/charger systems send messages to their respective rectifiers for processing.

Referring to FIG. 6, a dual UPS system 100 is shown in accordance with one embodiment of the present disclosure. The system 100 makes use of a first UPS system 102a (hereinafter simply "UPS 102a") and a second UPS system 102b (hereinafter simply "UPS 102b") which are coupled in parallel across a common battery 104 as well as across the input three phase power distribution (with or without a neutral line) connected to the Rectifier modules (not drawn) and across the output three phase junction for load connection coming out from CMCs 112a and 112b. While two UPSs are used in this example, it will be appreciated that the system 100 is not limited to use with only two UPSs, and the system 100 may incorporate more than two UPSs. For convenience, the following discussion will provide one example where the system 100 has two UPSs.

UPS 102a in this example has a rectifier 106a, a booster/charger 108a, an inverter 110a, and the CMC 112a (Common Mode Choke, hereinafter simply "CMC"). UPS 102b has the same components which are labeled 106b, 108b, 110b and 112b, respectively. The positive battery terminal (Batt+) of the battery 104 is connected in parallel to an input $108a_1$ of the booster/charger 108a and to an input $108b_1$ of the booster/charger 108b. Likewise, the negative battery terminal of the battery 104 is coupled in parallel to an input $108a_2$ of the booster/charger 108a and an input $108b_2$ of the booster/charger 108b.

As explained above, when the DC− bus voltage of one of the UPSs 102a or 102b has been shifted by the above-described neutral balancing algorithm, a current will be flowing between the Batt− line 114a and the Batt− line 114b. To monitor this current flow a first current transducer 116a may be placed adjacent the Batt− line 114a, and a second current transducer 116b may be placed adjacent the Batt− line 114b. The current transducers may be Hall-effect sensors or any other suitable DC current sensing components. It will be appreciated that the Batt− line 114a represents the DC− bus for the UPS 102a and the Batt− line 114b represents the DC− bus for the UPS 102b.

Figure 3:
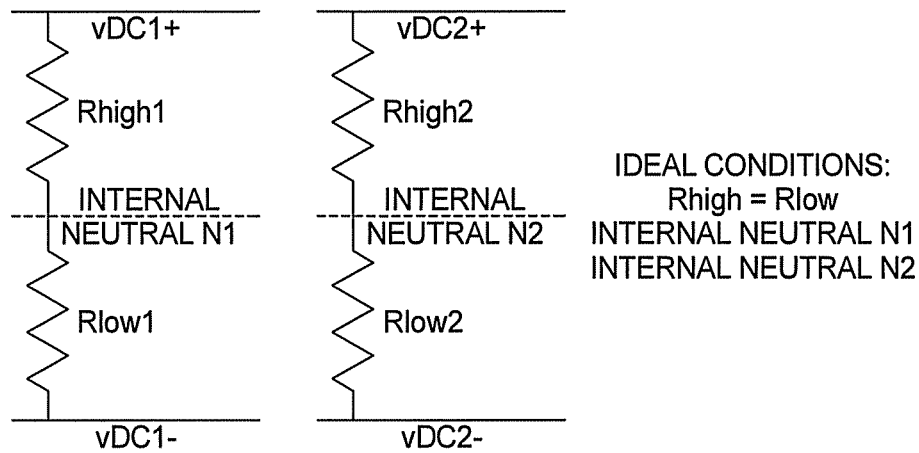
FIG. 3 is a prior art diagram showing the ideal condition where the two resistors bridging the DC+ and DC− lines of the two UPSs are identical in resistance, which results in the internal neutrals of the two UPSs being perfectly aligned.
Figure 4:
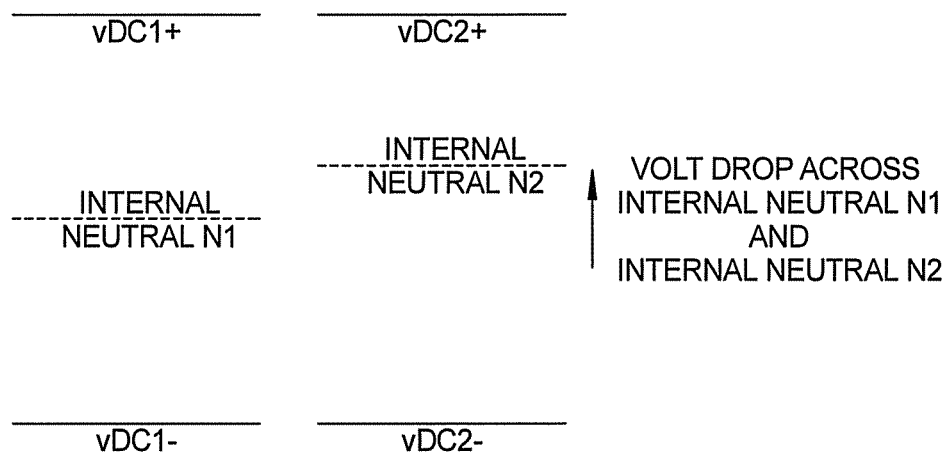
FIG. 4 is a prior art diagram showing the internal neutral voltages of the two UPSs (relative to the neutral of the star configuration input power signal from the power source) misaligned.
Figure 5:
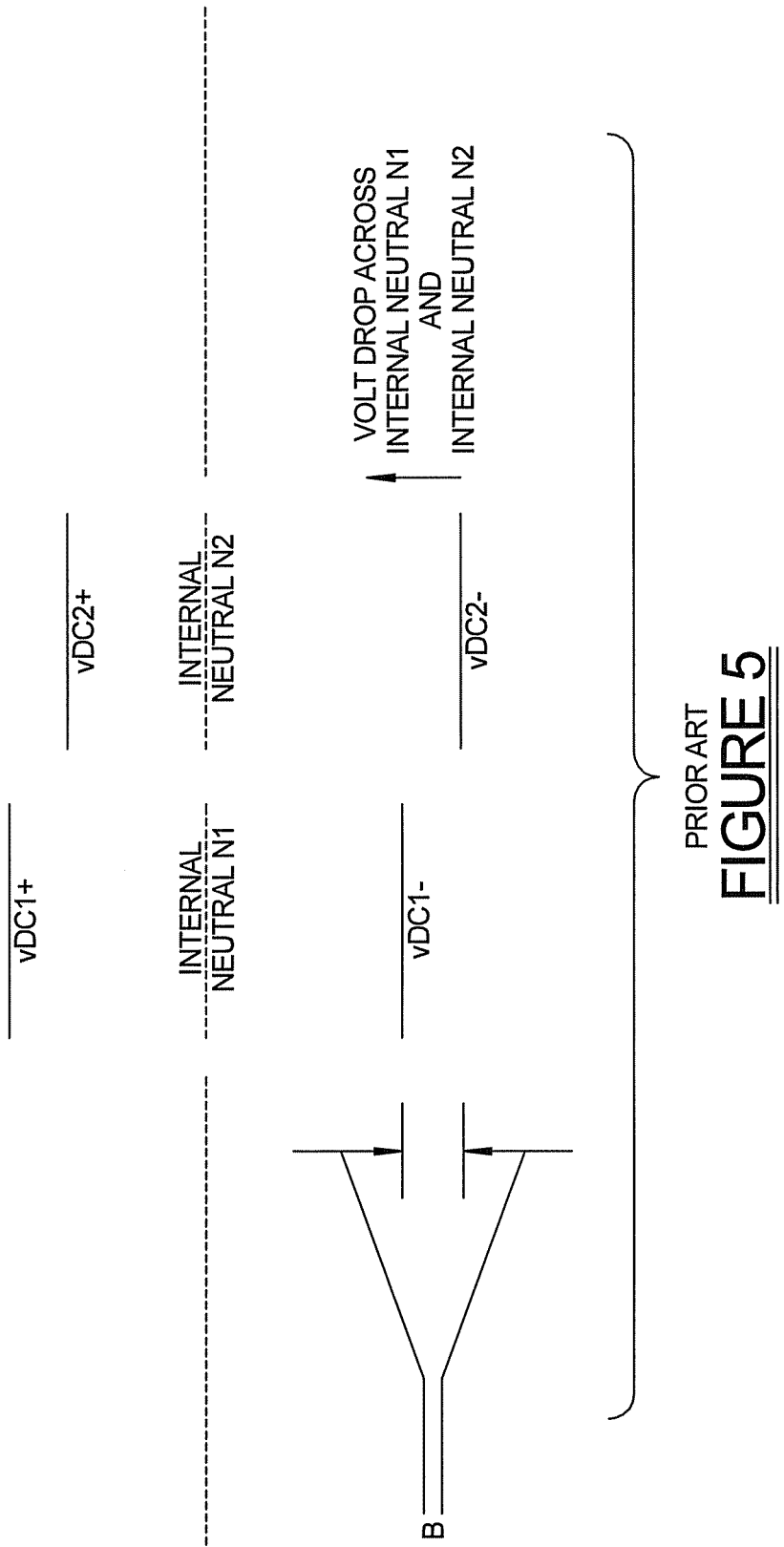
FIG. 5 is a prior art diagram illustrating the internal neutrals of two UPSs aligned after the internal neutral correction is performed, and also showing the resulting misalignment of the DC− bus voltage of UPS 2 relative to the DC− bus voltage of UPS 1.

The current transducer 116a is in communication with a digital signal processor (DSP) 118a integrated into, or otherwise in communication with, the booster/charger 108a. Similarly, the current transducer 116b is in communication with a DSP 118b which may be integrated into or otherwise in communication with the booster/charger 108b. The booster/chargers 108a and 108b include their own Battery+ current sensors, although these have not been shown to avoid cluttering the drawing. During operation the current transducers 116a, 116b provide current level signals to their respective DSPs 118a or 118b. The Battery− current, along with the Battery+ current, are fed as the input signals to an algorithm running in both UPSs 102a and 102b. From these current signals the current difference (Battery+−Battery−) is determined by the algorithm. This current difference is then used to determine the adjustment needed to the DC− bus voltages, in order to align the two DC− bus voltages, without shifting the DC internal neutral voltage described in connection with FIGS. 3-5.

Figure 7B:
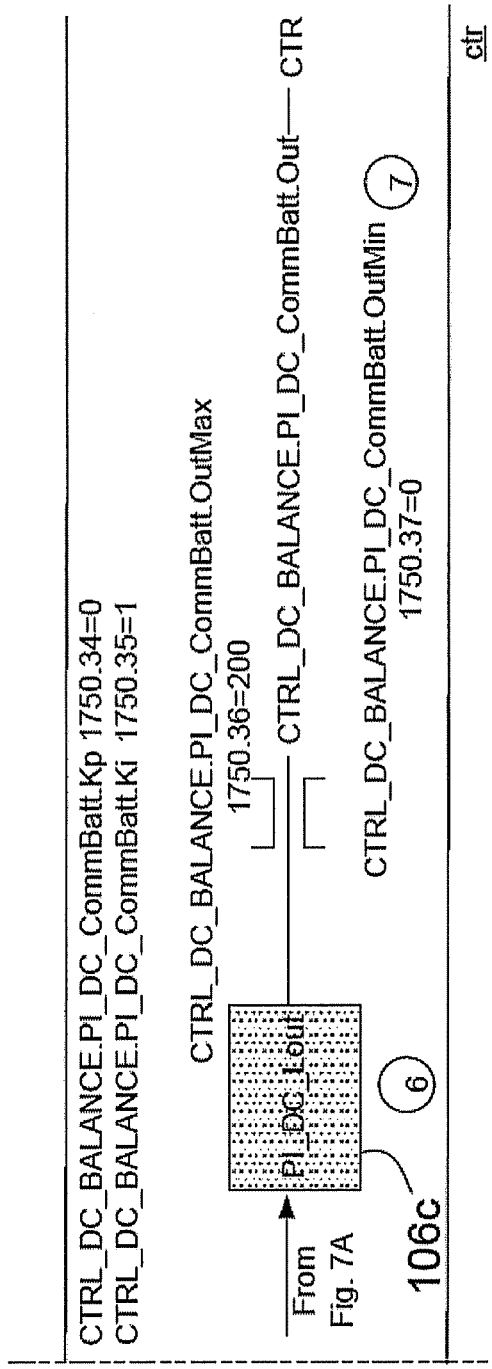
FIGS. 7A-&B are a simplified schematic drawing illustrating operations performed within the rectifier of all UPSs to limit the DC current exchanged among UPSs on battery− power wires.
Figure 8:
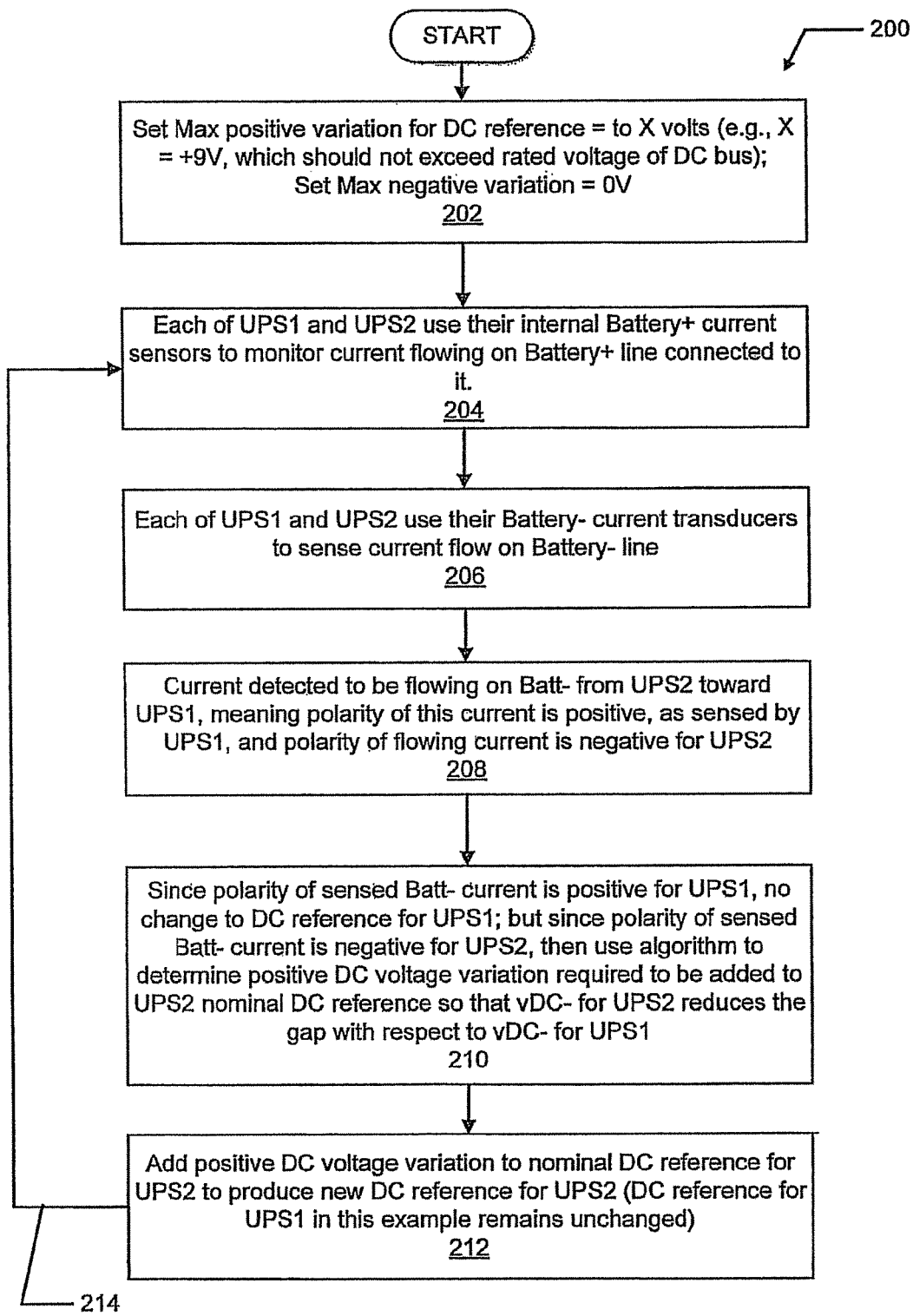
FIG. 8 is a flowchart of various operations that may be performed in creating the DC voltage offset value needed to shift the DC− bus voltage of UPSs into alignment among all the DC− bus voltage of the UPSs when the two (or more) UPSs are sharing a common battery.

A continuous control methodology for determining the needed DC− offset voltage to eliminate the above-described DC− imbalance is shown in the diagram of FIGS. 7A-7B and flowchart 200 of FIG. 8. In FIG. 8, the methodology of the present application starts correcting, and continuously and repeatedly corrects, the DC references in the direction that minimizes current flowing between the UPS1 and UPS2 units. This is done step by step (about every 500 ms, but this timing is not mandatory), and gradually the current exchanged is reduced so that the difference in current between the Batt− line 114a of UPS 1 and the Batt− line 114b of UPS 2 is gradually corrected, with each step through the operations of the flowchart 200, until the current difference is essentially zero.

With specific reference to FIG. 8, at operation 202, the control methodology of the present disclosure initially involves setting a maximum positive variation for DC reference equal to X volts (in one example "X volts" may be 9V). The maximum negative variation is also set to equal to 0V.

At operation 204 each of UPS 102a (i.e., UPS1) and UPS 102b (UPS2) may use their internal Battery+ current sensors to monitor current flowing on the Batt+ line connected thereto. At operation 206 each of the UPS 102a and UPS 102b may use their Battery− current transducers 116a and 116b to sense current flowing on the Batt− lines 114a and 114b.

At operation 208 current is detected to be flowing on the Batt− line from UPS 102b (UPS 2) toward UPS 102a (UPS1). This means the polarity of the current is positive, as sensed by UPS 102a (UPS1), and the polarity of the flowing current is negative for UPS 102b (UPS2). For what regards UPS1, notice that a negative current sensed on 114a would cause a positive variation on UPS1 DC− reference while a positive current sensed on 114a would cause a negative variation on UPS1 DC− reference. The same applies to UPS2.

At operation 210, since the polarity of the sensed Batt− current is positive for UPS 102a (UPS1), there is no change to the DC reference for UPS 102a (UPS1) because of the maximum negative variation settled equal to 0V in operation 202 described above. But since Batt− current is sensed negative for UPS 102b (UPS2), then the methodology determines the positive DC voltage variation required to be added to UPS 102b (UPS2) nominal DC reference so that vDC− for UPS 102b (UPS2) reduces the gap with respect to vDC− for UPS 102a (UPS1).

At operation 212 the positive DC voltage variation determined at operation 210 is added to the nominal DC reference for UPS 102b (UPS2) to produce a new DC reference for UPS 102b. In this example the DC reference for UPS 102a (UPS1) remains unchanged.

It will be appreciated that the operations 204-212 described above for determining the needed positive DC voltage variation that needs to be added to either the DC reference for UPS 102a or the DC reference for UPS 102b are performed repeatedly, as indicated by loop back line 214. In one embodiment these operations are performed about every 500 ms. This means that the DC voltage variation to be applied is repeatedly "tuned" about every 500 ms, although this time interval could be shortened or lengthened depending on overall system requirements.

The above-described methodology can also be used when, in a parallel system of two UPS systems, one of the UPS systems is running on rectifier while the other UPS system is running by battery. This configuration may be thought of as a "hybrid" configuration. In the hybrid configuration the DC offset can be determined as explained herein and the DC reference signal (e.g., 390V, which would translate to 780V) adjusted as needed (e.g., to 786V) to align the two DC− bus values to substantially eliminate current flow on the DC− busses of the two UPS systems. The DC− unbalance correction in a "hybrid" configuration is achieved with the same algorithm described above but settling the maximum positive variation for DC reference equal to X volts (typically 9V) and the maximum negative variation equal to −X volts (a typically −9V). Refer to operation 202 described above for variation limits setting.

The system and method of the present application therefore provides a system and methodology for enabling the outputs of two UPS systems sharing a common battery to be controlled in a manner that eliminates the undesirable situation of current flowing on the DC− bus after a neutral imbalance is corrected. The system and methodology of the present disclosure can be easily implemented in a UPS system with little or no modifications to a typical UPS system.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. For a system having a first uninterruptible power supply (UPS 1) and a second uninterruptible power supply (UPS 2), and where the two UPSs are connected in parallel across a DC+ and a DC− terminal of a common battery, and where a neutral imbalance between neutral lines of the two UPSs has been corrected, giving rise to a current flow from a DC− bus of one of the UPSs to a DC− bus of the other one of the UPSs, a method for correcting a nominal DC reference voltage for the one UPS to eliminate the current flow to the DC− bus of the other UPS, the method comprising:

using a first signal processing subsystem, independently associated with the UPS 1, and operating in connection with a first processing algorithm running on the UPS 1, to independently sense when current is flowing on the DC− bus from the UPS 1 to the DC− bus of the UPS 2;

using a second signal processing subsystem independently associated with the UPS 2, and operating in connection with a second processing algorithm running on the UPS 2, to sense, independently of the first signal processing subsystem, when current is flowing on the DC− bus from the UPS 2 to the DC− bus of the UPS 1;

based on a magnitude of the sensed current flow and a direction of the sensed current flow, using only one or the other of the first or second signal processing subsystems which has detected a negative current flow on its associated said DC− bus, and one of the first or second algorithms associated with the one of the first or second signal processing systems which has detected the negative current flow on its associated said DC− bus, to determine a positive voltage required to be added to a nominal DC reference voltage of the one of the UPS 1 or the UPS 2 associated with the DC− bus experiencing the negative current flow, so that voltages of the DC− busses of the two UPSs are at least approximately equal;

adding the determined positive voltage, to a nominal DC reference of the one UPS detected to have current from on its said DC− bus to the other UPS, to iteratively produce a new DC reference for the one UPS, such that the voltages of the DC− busses of the two UPSs are at least approximately equal; and wherein the sensing of the current flow and the determining of the positive voltage are performed repeatedly in a step by step operation, in accordance with a predetermined time interval, to successively bring the DC− voltages of the two DC− busses to approximately equal values.

2. The method of claim 1, wherein the operation of sensing when current is flowing on the DC− bus of the one UPS to the DC− bus of the other UPS comprises independently sensing a current flow on each of the DC− busses of the two UPSs using separate current transducers.

3. The method of claim 1, wherein the sensing of the current flow and the determining of the positive voltage are performed approximately every 500 milliseconds.

4. The method of claim 1, further comprising using current sensors associated with each of the UPSs to sense current flowing on a DC+ bus of each said UPS, and using the sensed DC+ bus current to assist in determining when current is flowing from either one of the DC− busses toward the other.

5. The method of claim 4, wherein the sensing of the current flow is performed using separate Hall effect sensors each disposed in proximity to an associated one of the DC− busses.

6. For a system having a first uninterruptible power supply (UPS 1) and a second uninterruptible power supply (UPS 2), and where the two UPSs are connected in parallel across a DC+ and a DC− terminal of a common battery, and where an algorithm has been used to shift an internal neutral of a selected one of the UPSs to align internal neutral potentials of the UPSs, the alignment of the internal neutral potentials giving rise to a current flow either on a DC− bus of the UPS 2 toward a DC− bus of the UPS 1, or on the DC− bus of the UPS 1 toward the DC− bus of the UPS 2, a method for correcting a nominal DC reference voltage for one of the UPS 1 or UPS 2 to eliminate the current flow toward the DC− bus of the other one of the UPS 1 or UPS 2, the method comprising:

performing a sensing operation, using a first signal processing subsystem in connection with a first algorithm running on the UPS 1, to independently sense a current flowing on the DC− bus of the UPS 1;

performing a sensing operation, using a second signal processing subsystem in connection with a second algorithm running on the UPS 2, to independently sense a current flowing on the DC− bus of the UPS 2;

using the first signal processing subsystem and the first algorithm, independently associated with the first UPS, and the sensed currents to determine when current is flowing on the DC− bus of UPS 2 toward the DC− bus of UPS 1, independently of sensing performed by the second signal processing subsystem;

using the second signal processing subsystem and the second algorithm, independently associated with the second UPS, and the sensed currents to determine when current is flowing on the DC− bus of UPS 1 toward the DC− bus of UPS 2, independently of sensing operations being performed by the first signal processing subsystem;

when the second signal processing subsystem, using the second algorithm, determines that current is flowing on the DC−bus of UPS 2 toward the DC− bus of UPS 1, then using only the second signal processing subsystem to perform a determining operation to determine a positive DC voltage variation required to be added to a nominal DC reference voltage for the UPS 2 so that a voltage vDC− of the DC− bus of the UPS 2 will at least approximately equal a voltage vDC− of the DC− bus of the UPS 1, and adding the determined positive DC voltage to a nominal DC reference for UPS 2 to produce a new DC reference voltage for UPS 2;

when the first signal processing subsystem, using the first algorithm, determines that current is flowing on the DC-bus of UPS 1 toward the DC– bus of UPS 2, then using only the first signal processing subsystem to perform a determining operation to determine a positive DC voltage variation required to be added to a nominal DC reference voltage for the UPS1, independently of sensing operations being performed by the second signal processing subsystem, so that a voltage vDC– of the DC– bus of the UPS 1 will at least approximately equal a voltage vDC– of the DC– bus of the UPS 2, and adding the determined positive DC voltage to a nominal DC reference for UPS 1 to produce a new DC reference voltage for UPS 1; and wherein the performing of the sensing operations and the performing of the determining operation are performed repeatedly, in accordance with a predetermined time interval, to successively bring the vDC– of the DC– bus of the UPS 2 to at least approximately equal the vDC– of the DC– bus of the UPS 1, over a number of performance cycles.

7. The method of claim 6, wherein the performing of the sensing operations and the performing of the determining operation are performed approximately every 500 milliseconds.

8. The method of claim 6, further comprising initially setting a maximum positive variation for the DC reference voltage of each of the UPS 1 and the UPS 2 to a set value.

9. The method of claim 8, further comprising setting a maximum negative variation for the DC reference voltage of each of the UPS 1 and the UPS 2 to a value of zero.

10. The method of claim 6, wherein the current sensing of current flowing on the DC– bus of the UPS 1 is performed by a Hall effect sensor.

11. The method of claim 6, wherein the current sensing of current flowing on the DC– bus of the UPS 2 is performed by a Hall effect sensor.

12. The method of claim 6, wherein one of the UPS 1 or UPS 2 is being powered by the battery and the other is being powered by a rectifier.

13. The method of claim 6, wherein both the UPS 1 and the UPS 2 are being powered by the battery.

14. A system for use with at least a first uninterruptible power supply (UPS 1) and a second uninterruptible power supply (UPS 2), and where the two UPSs are connected across a DC+ and a DC– terminal of a common battery, and where a neutral imbalance between neutral lines of the two UPSs has been corrected, giving rise to a current flow from a DC– bus of the first UPS to a DC– bus of the second UPS, the system being for correcting a nominal DC reference voltage for the first UPS to eliminate the current flow to the DC– bus of the second UPS, the system comprising:

a first current transducer for sensing in real time a current flowing on the DC– bus of the first UPS;

a second current transducer for sensing in real time a current flowing on the DC– bus of the second UPS;

a first digital signal processor independently associated with the first UPS, and operating in connection with a first algorithm running on the first UPS, and responsive to the sensed current flowing on the DC– bus of the first UPS, and also a sensed current on a DC+ bus of the first UPS;

a second digital signal processor independently associated with the second UPS, and operating in connection with a second algorithm running on the second UPS, and responsive to the current flowing on the DC– bus of the second UPS, and also to a sensed current on a DC+ bus of the second UPS;

each digital signal processor being configured to independently determine, based on the sensed current flow associated with its respective said DC– bus, and using its associated first or second algorithm;

when current is detected independently by one or the other of the first or second current transducers as flowing on its associated said DC– bus to the DC– bus of the other one of said UPSs, and then creating a negative current flow relative to the DC– bus of the one of the first and second UPSs, to then use only the one of the first or second UPSs which is experiencing the negative current flow on its associated said DC– bus, to determine a positive voltage which needs to be added to a nominal reference voltage of its associated said UPS so that voltages of the DC– busses of the two UPSs are at least approximately equal; and to add the determined positive voltage to a nominal DC reference of its associated said UPS to produce a new DC reference for the associated said UPS, such that the voltages of the DC– busses of the two UPSs are at least approximately equal; and wherein each said digital signal processor senses the current flow and determines the determined positive voltage repeatedly in a step by step iterative operation, in accordance with a predetermined time interval, to successively and gradually add the determined positive voltage to bring the DC– voltages of the two DC– busses to approximately equal values.

15. The system of claim 14, wherein the first current transducer comprises a Hall effect current sensor.

16. The system of claim 14, wherein the second current transducer comprises a Hall effect current sensor.

17. The system of claim 14, wherein each said UPS includes:

a rectifier;

a booster/charger;

an inverter; and wherein the first digital signal processor is included in the booster/charger of the first UPS, and the second digital signal processor is included in the booster/charger of the second UPS.

* * * * *